(12) United States Patent
Gale (10) Patent No.: US 9,387,501 B2
(45) Date of Patent: Jul. 12, 2016

(54) FLYING INSECT SPRAY APPARATUS

(71) Applicant: Derrick Gale, Port Saint Lucie, FL (US)

(72) Inventor: Derrick Gale, Port Saint Lucie, FL (US)

( * ) Notice: Subject to any disclaimer, the term of this patent is extended or adjusted under 35 U.S.C. 154(b) by 143 days.

(21) Appl. No.: 14/283,469

(22) Filed: May 21, 2014

(65) Prior Publication Data

US 2015/0335004 A1 Nov. 26, 2015

(51) Int. Cl.
| | |
|---|---|
| *A01M 7/00* | (2006.01) |
| *A01M 13/00* | (2006.01) |
| *A01M 1/20* | (2006.01) |
| *B05B 11/00* | (2006.01) |
| *B05B 12/02* | (2006.01) |
| *B05B 1/20* | (2006.01) |
| *B05B 9/08* | (2006.01) |
| *B05B 12/12* | (2006.01) |

(52) U.S. Cl.
CPC .......... *B05B 11/3052* (2013.01); *A01M 1/2022* (2013.01); *A01M 1/2027* (2013.01); *A01M 1/2038* (2013.01); *A01M 7/00* (2013.01); *A01M 7/0003* (2013.01); *A01M 7/0089* (2013.01); *A01M 13/00* (2013.01); *B05B 12/02* (2013.01); *B05B 1/207* (2013.01); *B05B 9/0861* (2013.01); *B05B 12/122* (2013.01)

(58) Field of Classification Search
CPC ....... A01M 1/00; A01M 1/20; A01M 1/2022; A01M 1/2027; A01M 1/2033; A01M 1/2038; A01M 1/205; A01M 7/00; A01M 7/0003; A01M 7/0089
USPC ........... 43/132.1, 124, 900, 129, 125; 222/52, 222/649, 638, 639, 644, 645; 239/70, 69, 239/67, 289
See application file for complete search history.

(56) References Cited

U.S. PATENT DOCUMENTS

| | | | | |
|---|---|---|---|---|
| 648,263 | A * | 4/1900 | Hull | B05B 1/20 239/268 |
| 1,758,767 | A * | 5/1930 | Taggart | B05B 1/207 239/556 |
| 1,967,304 | A * | 7/1934 | Gray | A01M 13/00 43/124 |
| 2,534,464 | A * | 12/1950 | Marini | A61L 9/14 239/274 |
| 3,033,471 | A * | 5/1962 | Horn | B65D 83/267 222/160 |
| 3,195,777 | A * | 7/1965 | Hart | B65D 83/262 222/181.2 |
| 3,322,347 | A * | 5/1967 | Pierce | A01D 34/003 239/289 |
| 3,363,268 | A * | 1/1968 | Friedlander | E04H 4/0025 239/289 |
| 3,370,571 | A * | 2/1968 | Knapp | A01M 13/00 119/651 |

(Continued)

FOREIGN PATENT DOCUMENTS

| | | | | |
|---|---|---|---|---|
| FR | WO 2008148997 A2 * | 12/2008 | | A01M 1/2038 |
| JP | 09074969 A * | 3/1997 | | |
| JP | 2006130005 A * | 5/2006 | | |

*Primary Examiner* — Darren W Ark
(74) *Attorney, Agent, or Firm* — Dale J. Ream (57) ABSTRACT

A flying insect spray apparatus includes a casing having upper and lower portions that define an interior area. The casing may be mounted to a wall or ceiling of an enclosed structure such as a garage. A reservoir configured to hold an insecticide is positioned in the interior area, the reservoir having an outlet such as a hose. A pump is positioned in the interior area and electrically connected to the reservoir and configured to cause the insecticide to be urged from the reservoir when the pump is electrically actuated. The outlet is in fluid communication with a plurality of nozzles spaced apart radially about a dispensing member such that the insecticide is dispersed in a 360 degree radius of the casing. The spray apparatus includes a controller electrically connected to the pump that includes a timer, the controller configured to actuate the pump at a predetermined time.

19 Claims, 6 Drawing Sheets

(56) References Cited

U.S. PATENT DOCUMENTS

| | | | | |
|---|---|---|---|---|
| 3,390,817 A * | 7/1968 | Heropoulos | B65D 83/267 | 222/180 |
| 3,489,223 A * | 1/1970 | Bundo, Sr. | A24F 19/145 | 169/26 |
| 3,617,214 A * | 11/1971 | Dolac | A61L 9/14 | 222/180 |
| 3,739,944 A * | 6/1973 | Rogerson | G04F 3/06 | 222/649 |
| 3,741,309 A * | 6/1973 | McCulloch | A62C 3/06 | 169/26 |
| 3,778,924 A * | 12/1973 | Okui | A01M 1/2088 | 43/129 |
| 3,793,762 A * | 2/1974 | Stains | B05B 7/0416 | 239/77 |
| 3,896,881 A * | 7/1975 | De Boer | A62C 3/06 | 169/16 |
| 4,476,515 A * | 10/1984 | Coffee | B05B 5/04 | 118/626 |
| 4,570,824 A * | 2/1986 | Bolling | B65D 83/267 | 222/180 |
| 4,671,435 A * | 6/1987 | Stout | A01M 1/2044 | 222/646 |
| 4,721,246 A * | 1/1988 | Lefebvre | A01M 1/2033 | 43/900 |
| 4,938,144 A * | 7/1990 | Demarest | F42C 7/12 | 102/204 |
| 5,312,047 A * | 5/1994 | Akers | B05B 1/14 | 239/276 |
| 5,335,446 A * | 8/1994 | Shigetoyo | A01M 1/2033 | 43/125 |
| 5,390,833 A * | 2/1995 | Baumann | B05B 11/3056 | 222/180 |
| 5,465,525 A * | 11/1995 | Mifune | B25J 5/005 | 180/167 |
| 5,566,502 A * | 10/1996 | Shigetoyo | A01M 1/2072 | 43/125 |
| 5,598,954 A * | 2/1997 | Salzano | A47K 10/32 | 222/162 |
| 5,695,091 A * | 12/1997 | Winings | A47K 5/1217 | 222/1 |
| 5,772,074 A * | 6/1998 | Dial | B05B 11/3057 | 222/1 |
| 5,832,657 A * | 11/1998 | Jan | A01M 31/002 | 116/22 A |
| 5,964,403 A * | 10/1999 | Miller | A01M 1/2016 | 222/399 |
| 6,155,495 A * | 12/2000 | Jones | A63B 5/11 | 239/289 |
| 6,267,297 B1 * | 7/2001 | Contadini | A61L 9/12 | 222/646 |
| 6,339,897 B1 * | 1/2002 | Hayes | A01M 1/205 | 43/125 |
| 6,347,414 B2 * | 2/2002 | Contadini | | 4/222 |
| 6,445,301 B1 * | 9/2002 | Farrell | A01M 31/002 | 340/384.2 |
| 6,513,282 B2 * | 2/2003 | Schott | A01M 17/008 | 43/125 |
| 6,688,036 B1 * | 2/2004 | Gunn | A01M 13/003 | 43/125 |
| 6,739,479 B2 * | 5/2004 | Contadini | E03D 9/007 | 222/1 |
| 6,854,208 B1 * | 2/2005 | Chuang | A01M 1/2027 | 261/84 |
| 6,951,073 B2 * | 10/2005 | Moore | A01M 7/0014 | 43/132.1 |
| 7,066,218 B1 * | 6/2006 | Fleming | A01M 1/245 | 141/198 |
| 7,070,003 B1 * | 7/2006 | Smith | A62C 37/11 | 169/69 |
| 7,090,147 B2 * | 8/2006 | Lovett | A01M 1/2038 | 239/332 |
| 7,234,269 B2 * | 6/2007 | Yonker | A01M 1/2038 | 119/417 |
| 7,320,439 B2 * | 1/2008 | Davis | A01M 1/2038 | 239/329 |
| 7,540,433 B2 * | 6/2009 | Fleming | A01M 1/2038 | 141/198 |
| 7,641,594 B2 * | 1/2010 | Hickey | A63B 5/11 | 239/289 |
| 7,712,249 B1 * | 5/2010 | Modlin | A01M 1/205 | 239/102.2 |
| 7,893,829 B2 * | 2/2011 | Sipinski | A61L 9/14 | 250/338.1 |
| 7,908,791 B1 * | 3/2011 | Brash | A01M 13/003 | 43/125 |
| 8,201,756 B2 * | 6/2012 | Hornsby | B05B 9/0403 | 222/92 |
| 8,296,993 B2 * | 10/2012 | Modlin | A01M 1/205 | 239/102.2 |
| 8,430,337 B2 * | 4/2013 | Pearce, III | A01G 13/06 | 239/457 |
| 8,459,499 B2 * | 6/2013 | Sipinski | B65D 83/262 | 222/1 |
| 8,668,115 B2 * | 3/2014 | Sipinski | B65D 83/262 | 222/1 |
| 8,695,890 B2 * | 4/2014 | Butler | B65D 83/20 | 222/183 |
| 8,994,529 B2 * | 3/2015 | White | A01M 1/2022 | 239/329 |
| 9,108,782 B2 * | 8/2015 | Luc | A61L 9/12 | |
| 9,149,031 B2 * | 10/2015 | Shi | B01F 3/04085 | |
| 2004/0007787 A1 * | 1/2004 | Kvietok | A01M 1/2033 | 261/26 |
| 2004/0035949 A1 * | 2/2004 | Elkins | A01M 1/2044 | 239/70 |
| 2004/0118943 A1 * | 6/2004 | Huang | A01M 1/205 | 239/303 |
| 2005/0004714 A1 * | 1/2005 | Chen | A61L 9/14 | 700/283 |
| 2005/0224596 A1 * | 10/2005 | Panopoulos | A01M 1/2038 | 239/67 |
| 2006/0150470 A1 * | 7/2006 | Ronnau | A01M 1/026 | 43/58 |
| 2007/0066447 A1 * | 3/2007 | Overholt | A63B 5/11 | 482/27 |
| 2007/0151011 A1 * | 7/2007 | Brown | E03D 5/10 | 4/310 |
| 2007/0235555 A1 * | 10/2007 | Helf | A01M 1/205 | 239/102.2 |
| 2008/0083793 A1 * | 4/2008 | Swain | A01M 1/245 | 222/638 |
| 2008/0163541 A1 | 7/2008 | Harris | | |
| 2008/0184614 A1 * | 8/2008 | Higbee | A01M 1/026 | 43/132.1 |
| 2008/0256843 A1 | 10/2008 | Hack et al. | | |
| 2009/0294471 A1 * | 12/2009 | Paige | A61L 2/22 | 222/36 |
| 2010/0286803 A1 * | 11/2010 | Tillotson | A01M 1/026 | 700/94 |
| 2011/0284653 A1 * | 11/2011 | Butler | A01M 1/2033 | 239/34 |
| 2012/0042563 A1 * | 2/2012 | Anderson | A01G 1/00 | 43/132.1 |
| 2012/0051968 A1 | 3/2012 | Ivanne | | |
| 2012/0186007 A1 * | 7/2012 | Perez | E03D 9/052 | 4/213 |
| 2012/0317868 A1 | 12/2012 | Johnston et al. | | |
| 2013/0068788 A1 * | 3/2013 | Gasper | A01M 1/2038 | 222/63 |
| 2013/0205484 A1 * | 8/2013 | Taciuc | A47K 13/307 | 4/209 R |
| 2013/0305588 A1 | 11/2013 | Cann | | |
| 2014/0110428 A1 * | 4/2014 | Saleh | A61L 9/14 | 222/23 |
| 2014/0166781 A1 * | 6/2014 | Johnson | A61L 9/127 | 239/310 |
| 2014/0250767 A1 * | 9/2014 | Heugle | A01M 1/026 | 43/129 |
| 2015/0157003 A1 * | 6/2015 | White | A01M 1/2022 | 43/132.1 |

\* cited by examiner

FLYING INSECT SPRAY APPARATUS

BACKGROUND OF THE INVENTION

This invention relates generally to insect control devices and, more particularly, to a insecticide spraying apparatus for controlling flying insects within a closed structure having at least one open side movable between open and closed configurations.

Using a garage adjacent or connected to a residence as space for entertainment or relaxation is becoming more common. For instance, an overhead garage door may be raised to expose the space to natural sunlight and outdoor air. Sometimes, a screened wall may be used to reduce entry of flying insects into the space. Of course, other partially enclosed spaces having French doors, single pedestrian doors, or the like may also be opened and closed to provide a space with access to the outdoors. Unfortunately, attempting to have a home-like space in a pseudo-outdoor environment is made more difficult unless the presence of flies or other flying insects are controlled. Of course, it is also desirable to control flying insects even when a an outdoor enclosure is being used in a traditional manner, such as a garage or barn.

Various devices are known in the art or have been proposed for trapping and killing flies in an enclosed environment. Although assumably effective for their intended purposes, the existing devices are not configured to spray insecticide within the enclosed area on a timer basis or based on other conditions, such as only when doors are closed so as to trap the insects before the spraying begins.

Therefore, it would be desirable to have a flying insect spraying apparatus that may be mounted within a selectively enclosed space and actuated to spray insecticide therein. Further, it would be desirable to have a flying insect spraying apparatus that sprays a radially distributed insecticide at predetermined times so as to control fly populations within the enclosed space. In addition, it would be desirable to have a flying insect spraying apparatus that can be configured to dispense insecticide only when a door is closed and the space is clear of people.

SUMMARY OF THE INVENTION

A flying insect spray apparatus according to the present invention includes a casing having upper and lower portions that define an interior area and may be selectively opened and closed. The casing may be mounted to a wall or ceiling of an enclosed structure such as a garage or barn. A reservoir configured to hold an insecticide is positioned in the interior area, the reservoir having an outlet such as a hose. A pump is positioned in the interior area and electrically connected to the reservoir and configured to cause the insecticide to be urged from the reservoir when the pump is electrically actuated. The outlet is in fluid communication with a plurality of nozzles spaced apart radially about a dispensing member such that the insecticide is dispersed in a 360 degree radius of the casing. The spray apparatus includes a controller electrically connected to the pump that includes a timer, the controller configured to actuate the pump at a predetermined time.

Therefore, a general object of this invention is to provide a flying insect spray apparatus for dispersing insecticide within a closed environment, such as to kill flies therein.

Another object of this invention is to provide a flying insect spray apparatus, as aforesaid, that is configured to dispense insecticide at predetermined times according to a timer.

Still another object of this invention is to provide a flying insect spray apparatus, as aforesaid, having a casing that may be mounted within an enclosed space having an opening through which flying insects may enter and which can be selectively closed prior to dispensing insecticide.

Yet another object of this invention is to provide a flying insect spray apparatus, as aforesaid, having an infrared camera capable of determining if the opening into the enclosed space has been closed so that a spraying operation may proceed.

A further object of this invention is to provide a flying insect spray apparatus, as aforesaid, which can determine if the enclosed area is clear of a person prior to initiating a spraying operation.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A flying insect spray apparatus according to a preferred embodiment of the present invention will now be described in detail with reference to FIGS. 1 to 6 of the accompanying drawings. The flying insect spray apparatus 10 includes a casing 20, a reservoir 40, a pump 44, and a controller 60 for activating the pump 44 under predetermined conditions.

Figure 3A:
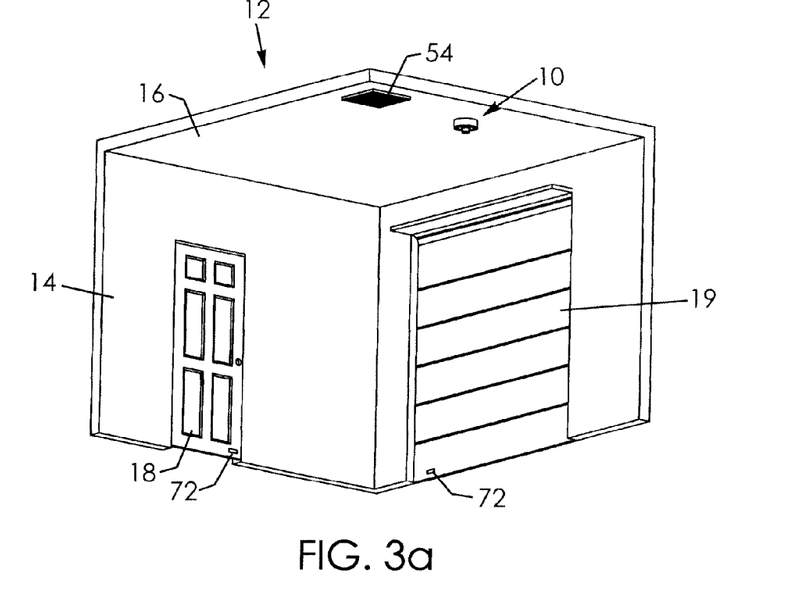
FIG. 3a is cut away view of the apparatus as in FIG. 1 in use in an enclosed structure illustrated with an overhead door in a closed configuration.
Figure 3B:
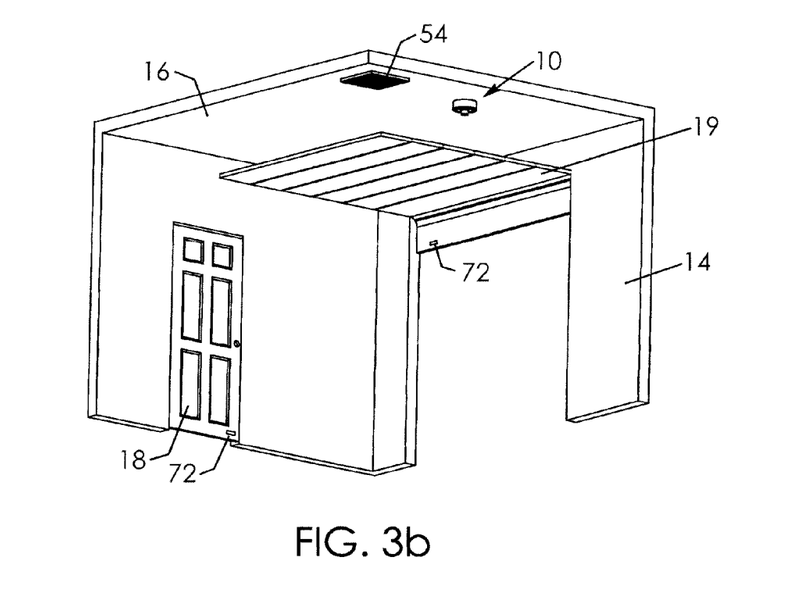
FIG. 3b is another cutaway view of the apparatus as in FIG. 3a illustrated with the overhead door in an open configuration.
Figure 4:
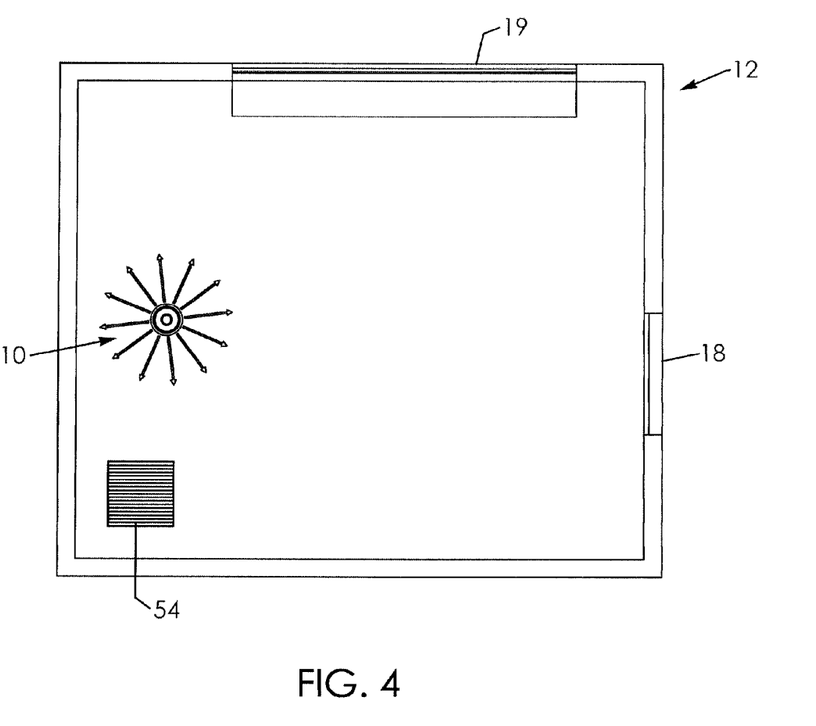
FIG. 4 bottom view of the view as in FIG. 3a with arrows illustrating radial dispensing of insecticide from the spray apparatus.

The spray apparatus 10 is intended for use in an enclosed structure 12 such as a garage, barn, or other enclosure in which flying insects tend to mass together in an undesirable volume. Specifically, the spray apparatus 10 is preferably used in an enclosure having walls 14 and a ceiling 16 that define an interior area and which may have one or more doors that may be selectively opened to receive ambient air, such as a walk-in pedestrian door 18 and perhaps an overhead door 19 movable between open and closed configurations. In this application, the door openings may be generally referred to as access portals and the door themselves may be referred to as access portal barriers. It is understood that in some embodiments, a wall or door may be a screened panel, traditional movable garage door, French doors, or the like.

The casing 20 of the spray apparatus 10 includes an upper portion 22 selectively coupled to a lower portion 28. More particularly, the upper portion 22 may include a top wall 24 and a continuous side wall 26 depending from the top wall 24. As shown in the illustrations, the casing 20 has a generally circular or cylindrical configuration. However, it is understood that the casing 20 may have a square, rectangular, or other suitable shape and configuration. The upper portion 22 defines an open bottom. Together, the upper 22 and lower 28 portions of the casing 20 define an interior area.

Figure 1:
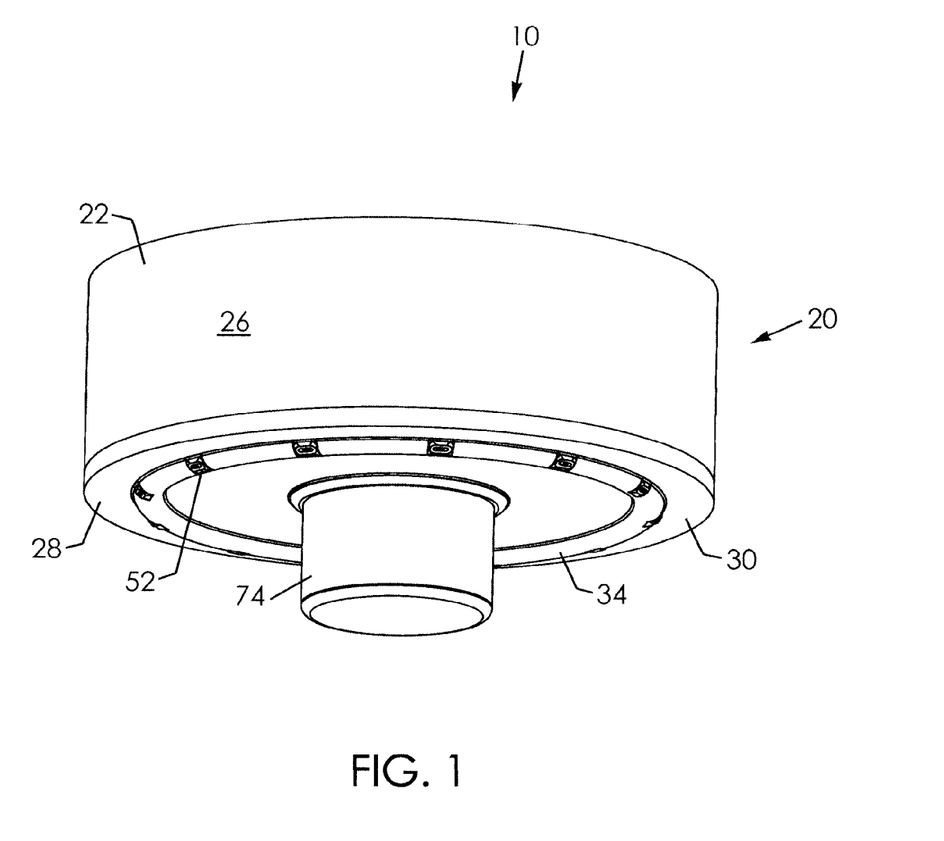
FIG. 1 is a perspective view of a flying insect spray apparatus according to a preferred embodiment of the present invention.
Figure 2:
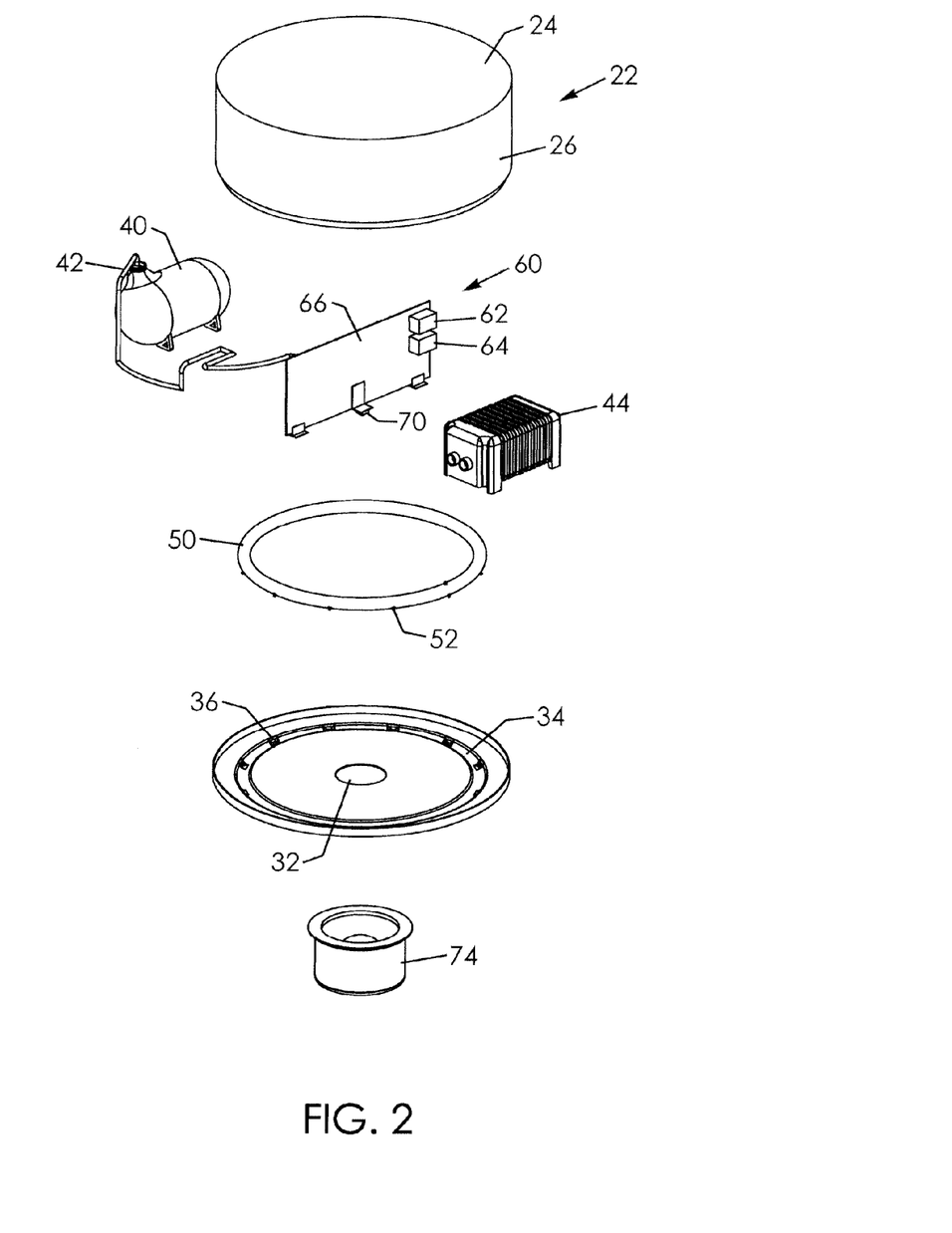
FIG. 2 is an exploded view of the spray apparatus as in FIG. 1.

The lower portion 28 of the casing 20 includes a bottom wall 30 defining an opening 32 and is releasably coupled to the side wall 26 of the upper portion 22, such as in a friction fit arrangement or with fasteners (not shown). The bottom wall 30 defines a channel 34 displaced from a perimeter edge thereof and extending around an entire perimeter of the lower portion 28 (FIG. 2). The channel 34 has a configuration complementary to a configuration of a dispensing member 50 so as to receive the dispensing member 50 as will be described later. The channel 34 defines a plurality of spaced apart apertures 36.

The reservoir 40 is positioned within the interior area of the casing 20. The reservoir 40 is configured to contain a liquid insecticide. The reservoir 40 may be refillable such that the apparatus 10 may be used repetitively over time. The reservoir 40 is accessible to be refilled when the lower portion 28 is separated from the upper portion 22 of the casing 20. The reservoir 40 may include an outlet 42 in the form of a hose connected to the reservoir 40 and extending away therefrom (FIG. 2). It is understood that in some embodiments, the reservoir 40 may be configured to contain an insecticide in gaseous or aerosol form.

Figure 5:
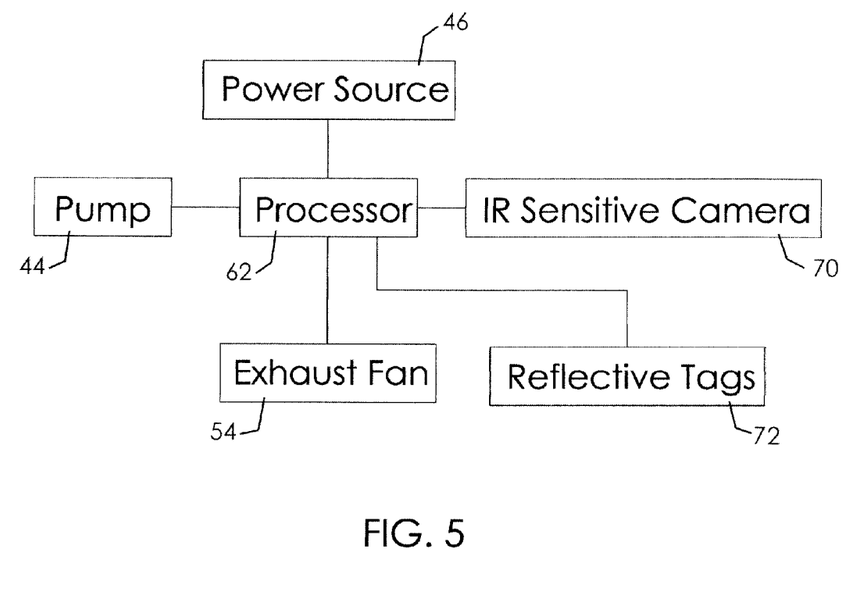
FIG. 5 is a block diagram showing the electrical components of the spray apparatus.

The pump 44 is also situated in the interior area of the casing 20 and is operatively coupled to the reservoir 40. It is understood that when the pump 44 is actuated, such as by being electrically energized, the pump 44 causes the insecticide to be urged out of the reservoir 40 through the outlet 42 (e.g. hose). The pump 44 may be electrically connected to a power supply 46, such as an electrical outlet or a battery (FIG. 5).

A nozzle member is in fluid communication with the outlet 42 of the reservoir 40 such that insecticide is dispensed through the nozzle member when the pump 44 is energized. Preferably, the dispensing member 50 actually includes a plurality of nozzles 52 spaced apart in a radial arrangement about a dispensing member 50 (FIG. 2). The dispensing member 50 may have a generally circular configuration such that insecticide is dispensed and sprayed in a 360 degree pattern when the pump 44 is actuated. The dispensing member 50, therefore, may have a ring-shaped configuration and be constructed of a tubular material such that the insecticide is evenly distributed to each of the plurality of nozzles 52. As described above, the dispensing member 50 has a configuration complementary to that of the channel 34 defined by the lower portion 28 of the casing 20 so as to nest therein. When received in the channel 34, each of the plurality of nozzles 52 registers with a respective aperture 36.

The controller 60 is positioned in the interior area of the casing 20. The controller 60 may be circuitry or a printed circuit board 66 ("PCB"). The controller 60 is electrically connected to the pump 44 and may include a timer. In one embodiment, the controller 60 is configured to energize the pump 44 each time the timer indicates expiration of a predetermined amount of time. In another embodiment, the controller 60 includes a processor 62 and a memory 64, the memory 64 including programming instructions to be executed by the processor 62. In this embodiment, the programming instructions, when executed by the processor 62, cause the processor 62 to actuate the pump 44 to dispense the insecticide.

Regarding the "predetermined time," the predetermined time may be an amount of time since the last activation of the pump 44 and may be calculated by the timer under processor 62 control. In another embodiment, the "predetermined time" may refer to a specific predetermined time of day. For instance, it might be known that flies or another type of flying insect are particularly thick within the enclosed space at a certain time of day. In such case, the apparatus 10 may be programmed to dispense insecticide at the time most likely to kill the largest mass of insects.

Figure 6:
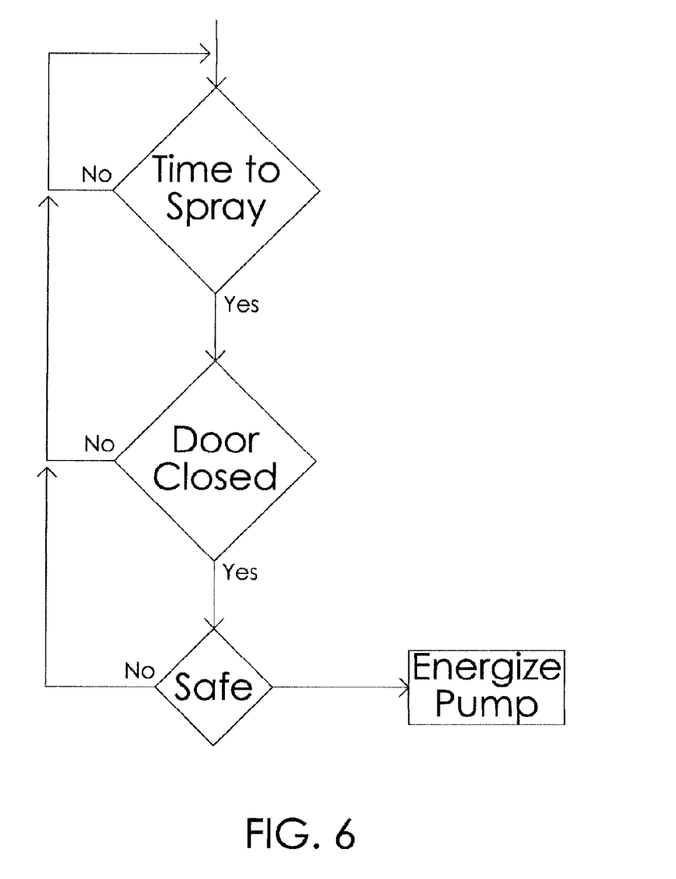
FIG. 6 is a flowchart illustrating an algorithm executed by the processor in one embodiment of the present invention.

The programming instructions executed by the processor 62 enable the insecticide to be dispensed under specific conditions, as shown by the algorithm illustrated in FIG. 6. For instance, the controller 60 includes means for determining if an access portal barrier, i.e. a door, is closed and, if so, to energize the pump 44 when at the predetermined time as indicated by the timer. In some embodiments, it may be determined to allow the pump 44 to activate the pump 44 even if the door remains open.

More particularly, the means for determining if the access portal is closed may include an infrared light sensitive camera 70 ("an IR camera) situated in the upper portion 22 of the casing 20. The IR camera 70 may be mounted to a lower edge of the PCB 66 as shown in FIG. 2. An IR camera 70 is configured to detect light that is in the invisible light spectrum, also known as infrared light energy. IR technology is often used to detect thermal energy such as for night vision applications. One or more IR tags 72 may be included for use with the IR camera 70 and may be situated remote from the IR camera 70. The IR tag 72 provides enhanced reflection of infrared light so as to be detected more readily by the IR camera 70. IR tags 72 are used for tracking desired targets. In the present application, an IR tag 72 may be positioned on the access barrier, i.e. door, within the enclosed structure. The IR camera 70 is configured to detect the position of the IR tag 72 and to communicate this data to the processor 62 to which it is electrically connected for data transfer. In some embodiments, a plurality of IR tags may be used for tracking purposes.

The position of the IR tag 72 within the enclosed structure may be referred to as a "predetermined condition." Under programming control, different actions may be taken by the processor 62 depending on the detected position of the IR tag 72. In one embodiment, the programming, when executed by the processor 62, causes the processor 62 to actuate the pump 44 to dispense insecticide from the reservoir 40 only when the position of the IR tag 72 is indicative that the door to the enclosed structure is closed. As is an object of the invention, insecticide is preferably sprayed at a time when flies or other flying insects are essentially captive within the enclosed structure and cannot escape. In one embodiment, the programming causes the processor 62 to energize the pump 44 only when the timer indicates a predetermined time and when the IR tag 72 indicates a predetermined condition, such as door closure.

In one embodiment, programming causes the processor 62 to communicate with the IR camera 70 to determine if a human body is present within the interior area of the enclosed area. Certainly, the IR camera 70 is able to detect the thermal energy emitted by a person and communicate this data to the processor 62. In the same manner, the processor 62 can determine the presence of other living bodies, such as dogs, cats, birds, and the like. An activation of the pump 44, then, can be delayed until the interior area is clear of persons or animals before being activated to dispense insecticide. In this embodiment, the programming may cause the processor 62 to actuate the pump 44 only when the timer indicates a predetermined time and when the IR tag 72 indicates a predetermined condition, such as door closure, and when the camera 70 verifies that no human or animal is in the enclosed space. It is contemplated that the apparatus 10 may include an audible or visual alert advising humans to vacate the area when the predetermined time is soon to be reached.

In one embodiment, the programming may cause the processor 62 to actuate the pump 44 only when the timer indicates a predetermined time and when the camera 70 verifies that no human or animal is in the enclosed space. In other words, the spraying of insecticide may be allowed even when the door remains at a raised or open configuration.

In another aspect of the invention, the apparatus 10 may include an exhaust fan 54 displaced from the casing 20. The exhaust fan 54 may be operatively connected to the processor 62, either wirelessly or with wires. Under programming control, the processor 62 may actuate the exhaust fan 54 to withdraw ambient air a predetermined amount of time after dispersing insecticide, such as to clear the air so that humans or animals can return to the interior area of the enclosed structure.

The bottom wall 30 of the lower portion 28 of the casing 20 defines an opening 32 (FIG. 2). The IR camera 70, which is mounted to a lower edge of the PCB 66, may be positioned proximate the opening 32 so as to capture infrared light within the interior area of the enclosed structure. The apparatus 10 may include panoramic reflector 74 coupled to the bottom wall 30 and situated in the opening 32. The panoramic reflector 74 is configured to reflect infrared light from a 360 degree radius about the casing 20, such as below the casing 20 when the casing 20 is mounted to a ceiling 16 of the enclosed structure. The panoramic reflector 74, therefore, enhances the ability of the IR camera 70 to detect infrared light reflected by the IR tag 72, human body, or the like.

In use, the casing 20 may be mounted to the ceiling 16 or wall 14 of an enclosed structure 12 such as a garage, barn, or other structure having at least one door or wall that is movable between open and closed configurations and that is susceptible to flying insects. In one embodiment, the apparatus 10 will dispense insecticide from the reservoir 40 at predetermined intervals of time, the insecticide being evenly and thoroughly distributed by the radially distributed nozzles 52 of the dispensing member 50. In other embodiments, programming executed by a processor 62 regulates activation of a pump 44 according to predetermined conditions, such as if a door has been closed or only after determining that a person is not in the interior space.

It is understood that while certain forms of this invention have been illustrated and described, it is not limited thereto except insofar as such limitations are included in the following claims and allowable functional equivalents thereof.

The invention claimed is:

1. A flying insect spray apparatus for use in selectively spraying insecticide in an enclosed structure having an access portal barrier that is movable between open and closed configurations, said spray apparatus comprising:
   a casing having an upper portion and a lower portion removably coupled to said upper portion, said upper and lower portions collectively defining an interior area;
   a reservoir positioned in said interior area of said casing, said reservoir configured to hold the insecticide, said reservoir having an outlet;
   a pump positioned in said interior area of said casing and operatively coupled to said reservoir and configured to urge the insecticide to flow through said outlet when actuated;
   a nozzle member in fluid communication with said reservoir and configured to dispense the insecticide when said pump is actuated;
   a controller electrically connected to said pump, said controller having a timer configured to actuate said pump at a predetermined time;
   wherein:
      said nozzle member includes a plurality of nozzles spaced apart radially about a circular dispenser member; and
      said dispenser member has a tubular configuration in fluid communication with said reservoir such that the insecticide from said reservoir is distributed to said plurality of nozzles when said pump is actuated.

2. The spray apparatus as in claim 1, wherein:
   said lower portion of said casing defines a channel having a configuration complementary to a configuration of said dispenser member such that said dispenser member is nested therein;
   said channel defines a plurality of spaced apart apertures corresponding to said plurality of nozzles of said nozzle member, respectively.

3. The spray apparatus as in claim 1, wherein said controller includes a processor in electrical communication with a memory and said pump, said memory including programming selectively executed by said processor.

4. The spray apparatus as in claim 3, wherein said programming, when executed by said processor, causes said processor to actuate said pump at said predetermined time.

5. The spray apparatus as in claim 3, wherein:
   said controller includes means for determining if the access portal barrier is at the closed configuration; and
   said programming, when executed by said processor, causes said processor to actuate said pump at said predetermined time if said processor determined that the access portal barrier is at the closed configuration.

6. The spray apparatus as in claim 3, comprising:
   an IR camera in electrical communication with said processor;
   an IR tag remote from said camera, said IR tag having a high infrared light reflectivity identifiable by said IR camera;
   wherein said programming, when executed by said processor, causes said processor in coordination with said IR camera to determine if light reflected by said IR tag is indicative of a predetermined condition.

7. The spray apparatus as in claim 6, wherein said predetermined condition is that the access portal barrier of the enclosed structure is at the closed configuration.

8. The spray apparatus as in claim 6, wherein said programming, when executed by said processor, causes said processor to actuate said pump only if said timer is indicative of a predetermined time and said IR tag is indicative of said predetermined condition.

9. The spray apparatus as in claim 6, wherein said programming, when executed by said processor, causes said processor in coordination with said camera to determine if a human body is situated in the enclosed structure.

10. The spray apparatus as in claim 9, wherein said programming, when executed by said processor, causes said processor to actuate said pump only if said timer is indicative of a predetermined time, said IR tag is indicative of said predetermined condition, and no human body is situated in the enclosed structure.

11. The spray apparatus as in claim 10, wherein:
said lower portion of said casing defines an opening;
said spray apparatus comprising a panoramic reflector coupled to said lower portion of said casing and situated so as to cover said opening, said panoramic reflector configured to reflect infrared light from a 360 degree radius of the enclosed structure to said IR camera.

12. The spray apparatus as in claim 10, wherein said predetermined time is an amount of time since a previous actuation of said pump.

13. The spray apparatus as in claim 10, wherein said predetermined time is a predetermined time of day or night.

14. The spray apparatus as in claim 9, wherein said programming, when executed by said processor, causes said processor to actuate said pump only if said timer is indicative of a predetermined time and no human body is situated in the enclosed structure.

15. The spray apparatus as in claim 6, wherein:
said lower portion of said casing defines an opening;
said spray apparatus comprising a panoramic reflector coupled to said lower portion of said casing and situated so as to cover said opening, said panoramic reflector configured to reflect infrared light from a 360 degree radius of the enclosed structure to said IR camera.

16. The spray apparatus as in claim 6, wherein said IR tag includes a plurality of IR tags remote from said casing.

17. The spray apparatus as in claim 1, comprising an exhaust fan displaced from said casing and configured to withdraw ambient air from the enclosed structure.

18. The spray apparatus as in claim 1, wherein said predetermined time is an amount of time since a previous actuation of said pump.

19. The spray apparatus as in claim 1, wherein said predetermined time is a predetermined time of day or night.

* * * * *